United States Patent [19]

Sissala et al.

[11] Patent Number: 5,214,947
[45] Date of Patent: Jun. 1, 1993

[54] PROCEDURE AND APPARATUS FOR CHECKING THE STRAIGHTNESS OF ELEVATOR GUIDE RAILS AND STRAIGHTENING DEFLECTIONS

[75] Inventors: Mikko Sissala, Hyvinkaa, Finland; Peter Evans, Yowie Bay, Australia

[73] Assignee: Kone Elevator GmbH, Baar, Switzerland

[21] Appl. No.: 799,277

[22] Filed: Nov. 27, 1991

[30] Foreign Application Priority Data

Nov. 28, 1990 [FI] Finland ................................. 905843

[51] Int. Cl.⁵ .............................................. B21D 5/01
[52] U.S. Cl. ............................................ 72/17; 72/10; 72/389; 72/390
[58] Field of Search .................... 72/10, 17, 389, 390

[56] References Cited

U.S. PATENT DOCUMENTS

| | | | |
|---|---|---|---|
| 1,605,310 | 11/1926 | Weaver | 72/390 |
| 2,060,013 | 11/1936 | Baker | 72/389 |
| 2,216,152 | 10/1940 | Becker | 72/390 |
| 3,456,467 | 7/1969 | Hogarth | 72/389 |
| 3,713,312 | 1/1973 | Galdabini | 72/10 |
| 3,745,806 | 7/1973 | Ratfield . | |
| 4,079,817 | 3/1978 | Tosato et al. . | |
| 4,306,435 | 12/1981 | Galdabini | 72/389 |
| 4,627,170 | 12/1986 | McKechnie . | |
| 5,056,671 | 10/1991 | Thorsen . | |

FOREIGN PATENT DOCUMENTS

| | | | |
|---|---|---|---|
| 436325 | 10/1926 | Fed. Rep. of Germany . | |
| 825427 | 12/1951 | Fed. Rep. of Germany . | |
| 0479518 | 8/1975 | U.S.S.R. | 72/389 |
| 2172824 | 10/1986 | United Kingdom | 72/389 |

Primary Examiner—David Jones
Attorney, Agent, or Firm—Sughrue, Mion, Zinn, Macpeak and Seas

[57] ABSTRACT

The present invention relates to a procedure for checking the straightness of elevator guide rails and straightening deflections of the rails, and an apparatus for implementing the procedure. The elevator guide rails are inspected by means of a measuring apparatus movable along the rail, which apparatus includes two guides adapted to lean against the rail in longitudinally spaced relation to each other, by measuring the distance separating the measuring apparatus and guide rail. This distance measurement is taken, using the measuring device, at a point between the guides. The measured deflections are straightened, and the straightened areas are then checked, again by means of the measuring apparatus, to verify the results.

13 Claims, 7 Drawing Sheets

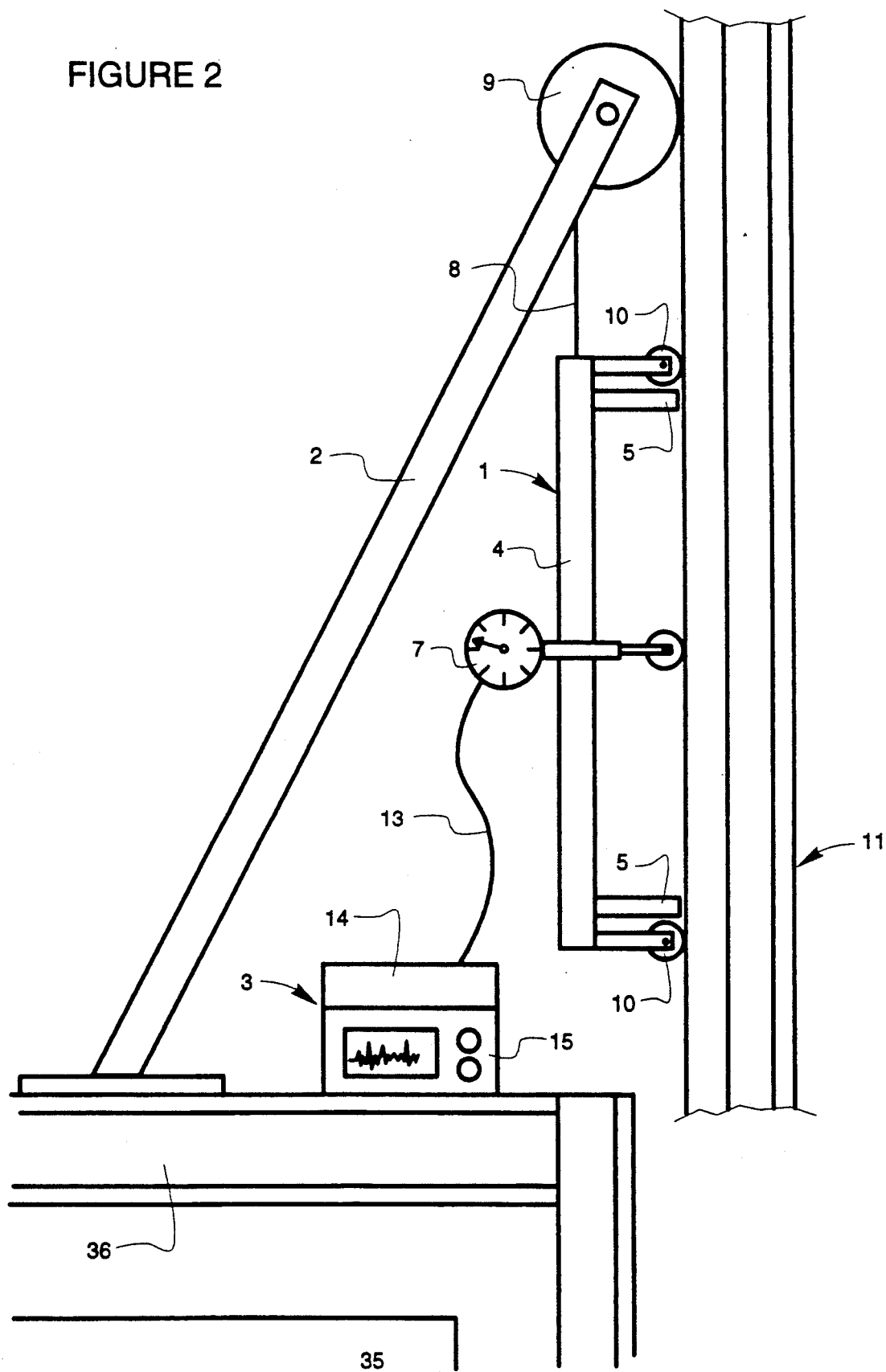

FIGURE 3a
FIGURE 3b
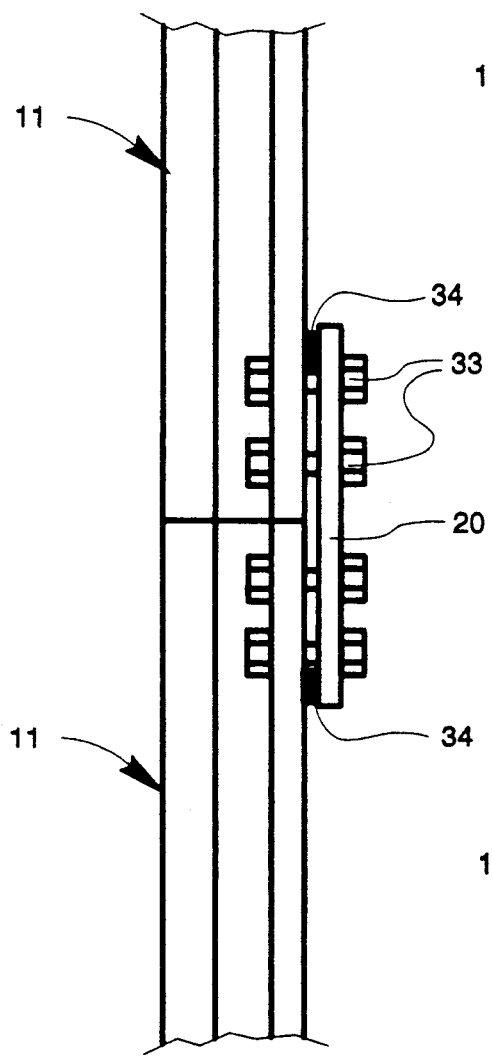
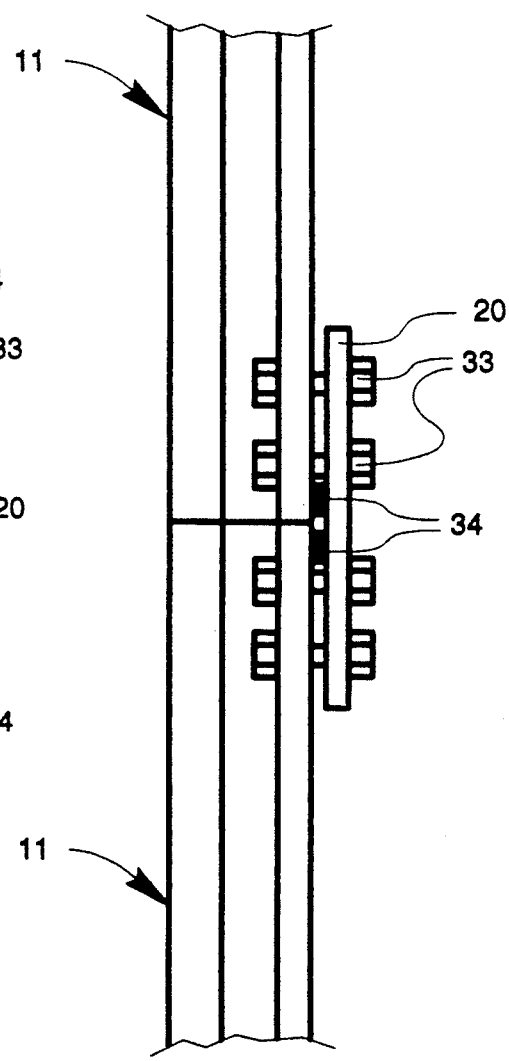

PROCEDURE AND APPARATUS FOR CHECKING THE STRAIGHTNESS OF ELEVATOR GUIDE RAILS AND STRAIGHTENING DEFLECTIONS

FIELD OF THE INVENTION

The present invention relates to a procedure and apparatus for measuring the straightness of elevator guide rails and straightening their deflections.

BACKGROUND TO THE INVENTION

In fast high-quality elevators, good travelling comfort is an objective of increasing importance. Lateral swing, i.e. horizontal vibration of the passenger cabin of the elevator, is the predominant parameter of travelling comfort, and its quality is a significant factor in discussions relating to the travelling comfort provided by an elevator.

Lateral swing may arise from several causes, but the primary causes are short, comparatively sharp bends and deflections in the guide rail line. The task of straightening these bends is generally the more difficult the longer the line is. On the other hand, long guide rail lines are generally used with faster elevators, and increased speed again means that the effect of bends and deflections in producing lateral swing becomes more pronounced.

The need to minimize lateral swing is greatest in the case of top-quality elevators, tall buildings and especially elevators serving the top floors of the building. These elevators travel through long distances along the guide rails at a high speed. Therefore, to achieve the required low level of lateral swing, the guide rail line must be very straight.

The equipment currently used for checking the straightness of the alignment of elevator guide rails, controlling the quality of guide rail lines, and charting the lines and the lateral deflections in them, requires special instrumentation and is quite bulky and complex. In addition, rendering the results obtained into a form usable for the straightening of deflections requires subsequent calculations by means of computers. Such a solution, which is technically very demanding, may be acceptable in research and product development, but it is not very practical or efficient when new guide rail lines are to be installed or old ones improved.

The means used at the site of installation, to check the straightness of the line, are often of a rather coarse nature, for example using a ruler or plumb line. Even visual estimates of the line quality have been resorted to. Thus, the estimates of line quality made in connection with actual installations have been ambiguous and have been dependent on the experience and skill of the estimator. As the repeatability of the measurement is low, it is generally not possible to obtain sufficiently reliable estimates of the quality of the corrections made.

Since the quality and straightness of the alignment of elevator guide rail lines may vary considerably from rail to rail and in different parts of the shaft, there is a requirement for means able to inspect complete installed guide rail lines easily and reliably. Similarly, there is a requirement to control the quality of corrections to guide rail lines as accurately as possible even during the execution of the corrections.

SUMMARY OF THE INVENTION

To provide a solution to the problem referred to above, the present invention proposes a procedure and apparatus for measuring the straightness of elevator guide rails and straightening their deflections.

According to one aspect of the invention there is provided a procedure for checking the straightness of elevator guide rails and straightening the rails, comprising the steps of: inspecting the elevator guide rails by means of a measuring device movable along the rail, said device comprising a frame supporting two longitudinally spaced guides adapted to maintain contact with the guide rail and a measuring device capable of measuring the distance between the guide rail and the frame of the measuring device, and generating a signal representative of the measured distance; determining which portions of the rails are deflected; and straightening the deflected portions of the rails.

According to another aspect of the invention, there is provided an apparatus for checking the straightness of elevator guide rails and straightening their deflections, said apparatus comprising: measuring means for checking the straightness of the guide rails, said measuring means comprising a measuring device movable along the rail and two guides which are adapted to lean against the rail in longitudinally spaced relation to each other, said measuring device including a measuring element disposed between said guides and capable of measuring the distance between the guide rail and the measuring device and means for generating a signal representative of the measured distance; and at least one straightening device provided with at least one gripping element adapted to allow the straightening device to be secured against the guide rail by gripping said guide rail from one side at points above and below the area to be straightened, and a thrust element adapted to apply a force to the guide rail from the side of the rail opposite from said gripping elements.

According to yet another aspect of the present invention, there is provided a measuring apparatus for checking the straightness of elevator guide rails, said measuring apparatus comprising: a measuring device movable along the rail, said measuring device including a measuring element capable of measuring the distance between the guide rail and the measuring device; means for generating a signal representative of the measured distance; and two guides adapted to lean against the rail in longitudinally spaced relation to each other, so as to maintain a substantially constant distance between the measuring apparatus and the guide rail.

The advantages achieved by the invention include the following:

The procedure of the invention is easy to apply, the actions required by the procedure are well adapted for implementation as part of the installation operation, and the apparatus is robust enough to be handled in the circumstances prevailing in an elevator shaft.

The apparatus can be used at the site of installation to chart the whole guide rail line and the problematic points in it by means of a recorder, allowing corrective work to be concentrated at the points of greatest deflection. This enables savings to be achieved in the costs of both inspection and straightening of the rails.

A better quality of guide rail installation is achieved as the deflections can be measured, and also the corrective actions taken can be immediately verified to the required accuracy.

The invention is easy to use, because the persons who installed the guide rails can perform the final quality inspection using the same equipment which was used in the installation work. Additionally, the invention is applicable to both new installations and modernization projects. Finally, the criteria of quality do not vary depending on the inspector's skill, or working conditions or other factors, and a permanent documentation of the inspection is easily obtained.

BRIEF DESCRIPTION OF THE DRAWINGS

Embodiments of the invention will now be described, by way of example, with reference to the accompanying drawings, in which:

FIG. 1d presents the cross-section of the guide rail at point A—A in FIG. 1a;

FIG. 2 diagrammatically illustrates a measuring apparatus according to the invention;

FIGS. 3a and 3b illustrate the straightening of deflections like those in FIGS. 1a and 1b;

DETAILED DESCRIPTION OF THE PREFERRED EMBODIMENTS

Figure 1A:
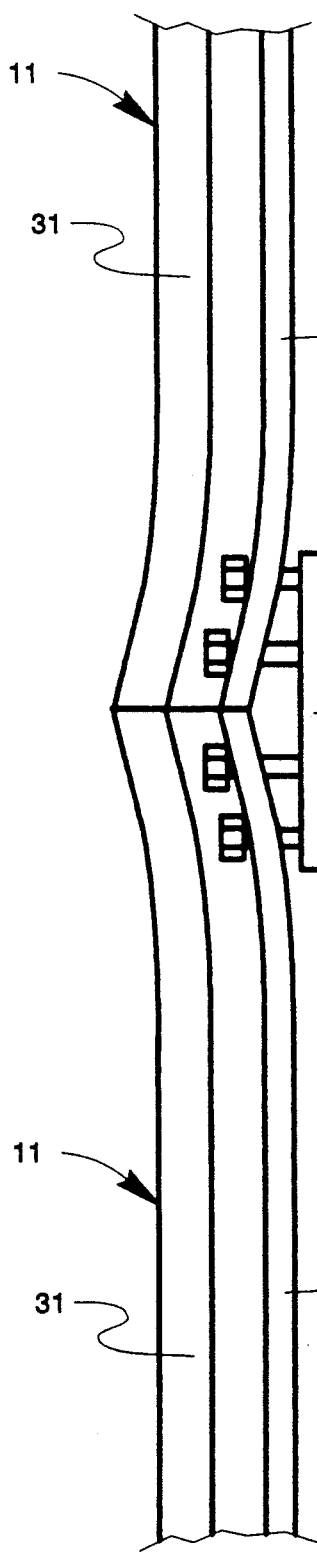
FIGS. 1a, 1b and 1c are diagrams representing some common types or deviation occurring at the joints between rails.

FIG. 1a illustrates a guide rail joint in which the guide rails 11 are so deflected that the installed guide rail line shows a deflection towards the guide flange 31 of the guide rail 11. In the guide rail joint illustrated in FIG. 1b, the ends of the guide rails 11 are bent in the plane of the guide flange 31 towards the back 32 of the guide rails 11. In the guide rail joint in FIG. 1c, the rails are deflected in the direction of the plane of the back 32 of the guide rails 11.

Figure 1B:
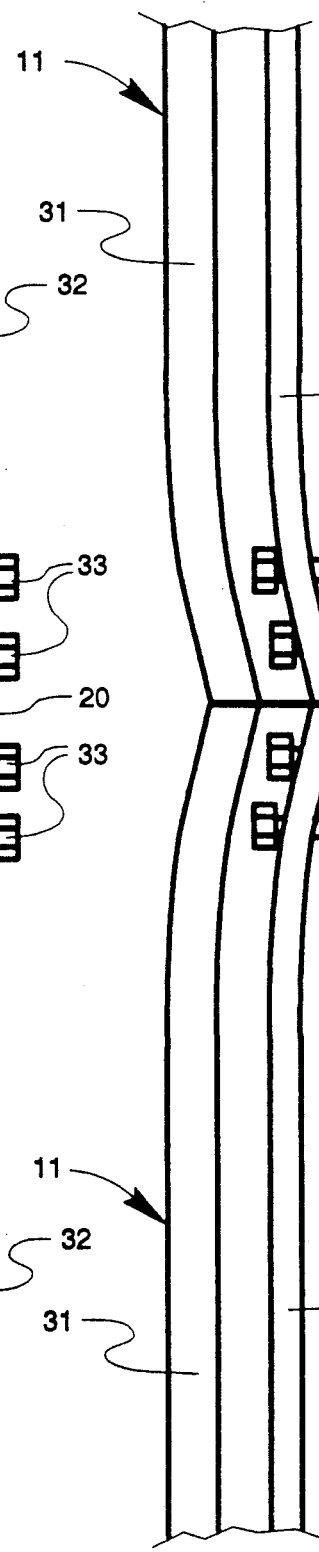
Figure 1C:
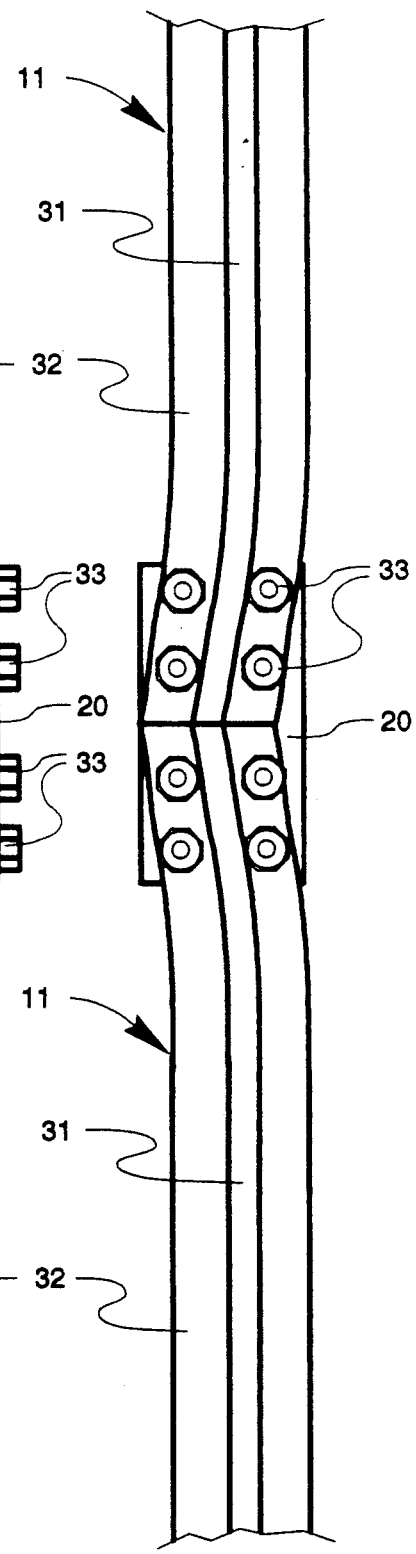

It should be noted that the deflections illustrated in FIGS. 1a, 1b and 1c are projections, while real deflections are usually combinations of those illustrated in FIG. 1. Furthermore, it will be clear that the types of deflection shown in FIG. 1 are not the only types possible, for example, the actual deflection may be of some other shape, such as an S-curvature. The guide rail joints presented in FIG. 1 show an exaggerated gap between the backing plate 20, which also serves as a connecting plate, and the guide rails 11. It will be noted that in a real joint, there is no such gap, the plate 20 and the guide rails 11 being tightly pressed together by means of fixing devices 33.

Figure 1D:
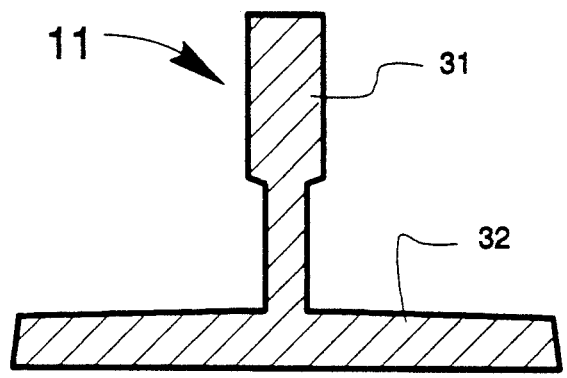

FIG. 1d illustrates the cross-section of a guide rail at point A—A in FIG. 1a. The guide rail consists of a T-shaped rail in which the top of the "T" constitutes the back 32 of the guide rail 11 and the leg of the "T" forms the guide flange 31 and guide surfaces.

According to the present invention, the operations for the checking and correction of the guide rail lines are carried out roughly in the following sequences: The guide rail line, partly or completely installed in an elevator shaft, is checked by means of a measuring apparatus, whereupon the necessary corrections of deflections are carried out. Finally, the correction results can be checked using the measuring apparatus.

FIG. 2 schematically illustrates the measuring apparatus used in the present invention. The measuring apparatus is generally composed of a measuring device 1, supporter 2 for suspending the measuring device so that it will follow the guide rail line, and recorder unit 3.

The measuring device 1, comprises a frame 4, guides 5 and 6, and a distance detector 7, is suspended (for example using a piece of steel wire 8) from the supporter 2, which is fixed to a portion of an elevator car unit 35, for example by means of a C-clamp (not shown). Connected to the supporter 2 is a guide element 9 which follows the rail line. The guide element 9 may consist of a wheel turning on a bearing, but a sliding element or equivalent would do as well. The guides 5 and 6 of the measuring device 1 are provided with wheels 10 and magnets which hold the wheels 10 of the guides 5, 6 in contact with the guide rail 11 by magnetic attraction. The distance detector 7 is provided with a follower wheel 12 which follows the guide rail 11, and whose distance from the frame 4 depends on the mutual positions of wheel 12 and the points of contact of the wheels 10 of the guides 5, 6 with the guide rail, and vice versa. The momentary distance data (as represented by a corresponding signal) provided by the distance detector is passed via a cable 13 to the recorder unit 3. The recorder unit 3 comprises a signal processing unit 14 and a data recorder 15. In the signal processing unit 14, the signal obtained from the detector 7 is amplified and it can also be filtered or processed in other known ways to produce a more usable signal. The detector 7 is preferably so calibrated that the detector reading equals the deviation of the measuring point from the straight line between the points of contact between the wheels 10 and the guide rail.

For each guide rail line, both the surface in the direction of the guide flange 31 and the surface in the direction of the back plate 32 of the rail 11 must be checked. Thus, the checking of one guide rail line using the apparatus described above is performed as follows:

As explained above, the measuring equipment is mounted on the elevator car so that the measuring device 1 follows one of the guide surfaces of the guide rail line. The elevator is now driven at a low speed from the bottom of the shaft to the top while the recorder 3 continuously records the distance signal supplied by the detector 7. At the top of the shaft, the measuring device 1 is remounted so that it will follow the guide surface perpendicular to the one just checked, whereupon the elevator is driven down while the distance signal is recorded as before. In this way, by driving the elevator once from end to end of the shaft and back, the lateral deflections of one guide rail line can be charted. On the basis of this charting, corrections can subsequently by carried out where the recorded deflections exceed the allowed limit.

Deflections are frequently observed around rail joints. This is due to the fact that the ends of the several-meter-long guide rails 11 are most likely to be exposed to bending forces during manufacture and subsequent operations such as cutting pieces of a given length, transportation etc.

FIG. 3a schematically illustrates the manner in which a deflection like that shown in FIG. 1a is straightened by using shims 34. One or more shims are placed between the ends of the connecting plate 20 and the back 32 of the guide rail 11. By means of the fixing devices 33, the guide rail 11 is tightened against the connecting plate 20, causing the rail joint to be straightened. FIG. 3b shows how a deflection like that in FIG. 1b is straightened by means of shims 34. One or more shims are placed between the connecting plate 20 and the back 32 of the guide rail 11 so that the fixing devices 33 are divided into two groups, one of which is above the shims 34 and the other group below the shims 34 along the guide rail 11. By means of the fixing devices 33, the guide rail 11 is tightened against the ends of the connecting plate 20, resulting in the straightening of the rail joint. There are shims of different thicknesses, so that by choosing a single shim of appropriate thickness, or by using a pack of several shims together, the required thickness range can be covered in sufficiently small steps, for example 0.1 mm.

Figure 4:
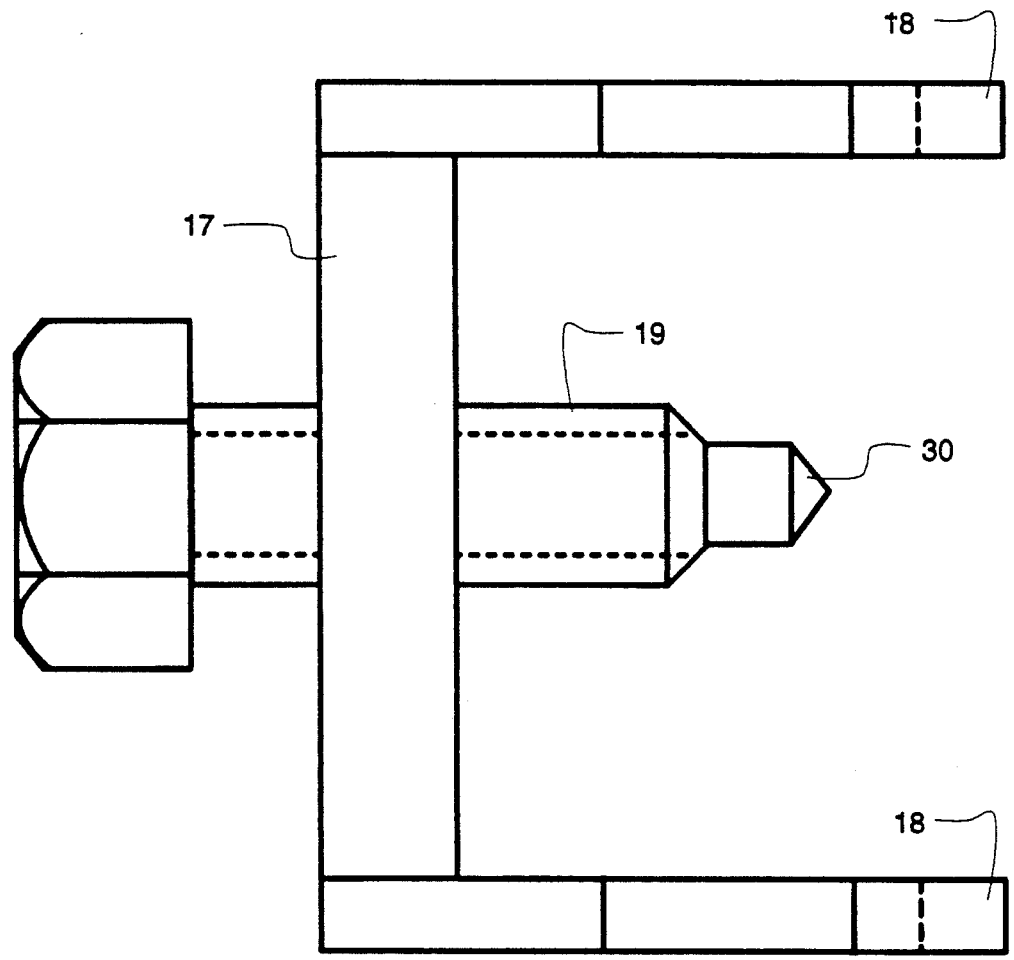
FIG. 4 illustrates a straightening device according to the invention.

FIG. 4 presents a straightening device 16 consisting of a substantially rigid frame 17, gripping hooks 18 and a screw 19 which turns in a threaded hole (not shown) in the frame. The screw can have a sharp tip 30, as illustrated, or be provided with a separate end piece (not shown) rotatably mounted on it. The rigidity of the straightening device 16 can be increased by, for example, connecting the hooks 18 with a beam or by replacing the hooks with a U-shaped or J-shaped beam. In this case, however, care must be taken not to allow the structure of the straightening device 16 to hinder the mounting and handling of the connecting plate 20 or its fixing bolts and nuts or the shims 34.

Figure 5:
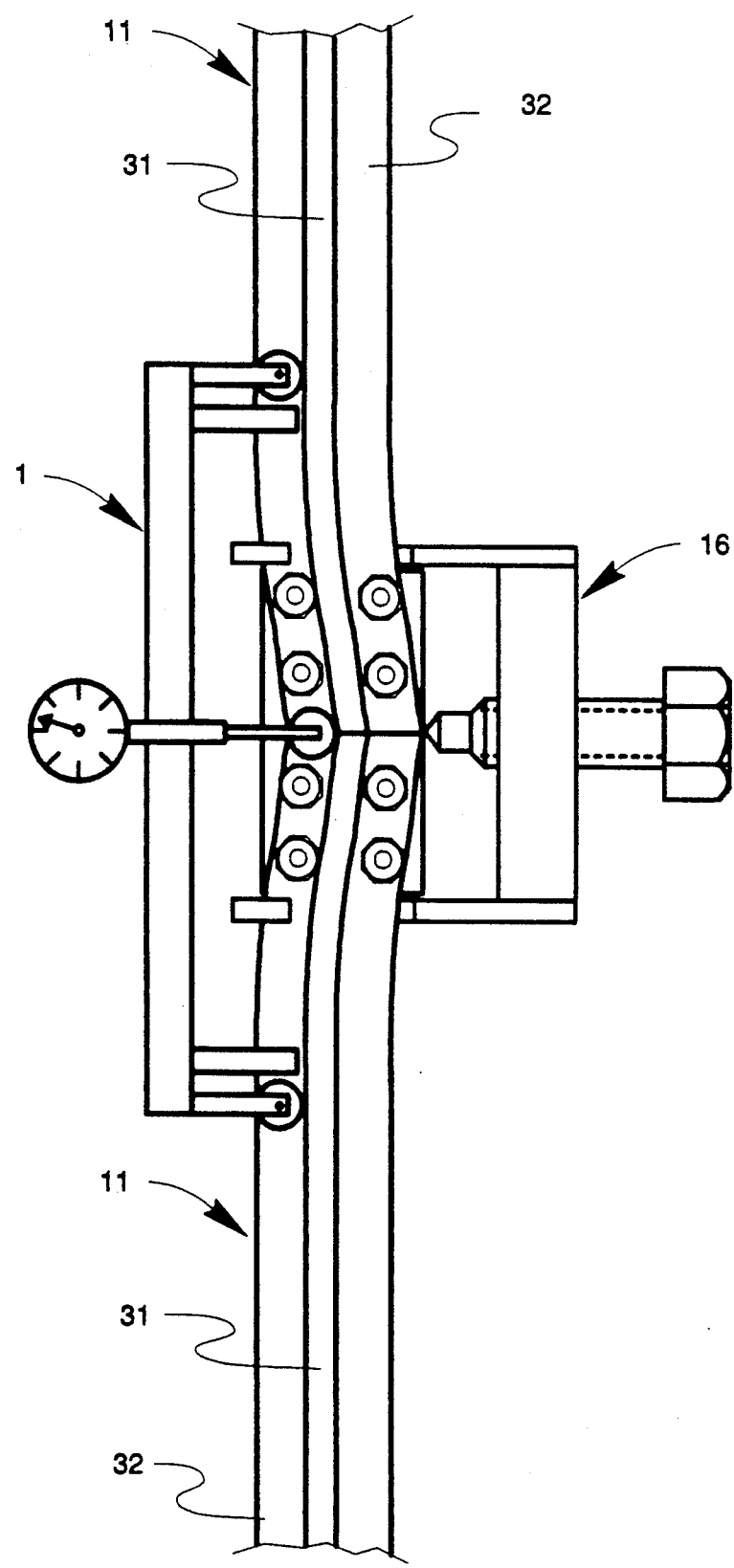
FIG. 5 illustrates the straightening of a rail joint by means of the straightening apparatus.

FIG. 5 illustrates how the straightening device 16 may be used together with the measuring device 1 to straighten a guide rail joint. The fixing devices 33 (i.e. screws/nuts) holding the rails 11 to the connecting plate 20 have been loosened to reduce friction. The straightening device 16 has been placed across the guide rail joint. The hooks 18 of the straightening device grip the guide rail back plate 32 by one side, while the tip 30 of the screw 19 is placed at or beside the seam between the rails 11 on the opposite side of the guide rail back 32. The measuring device 1, which is similarly placed across the guide rail joint, is used to monitor the progress of the straightening operation. When the deflection measured by the measuring device 1 indicates that the guide rail line is no longer noticeably curved around this joint, the loosened fixing devices 33 are tightened again and the straightening device 16 is released.

Figures 6A, 6B:
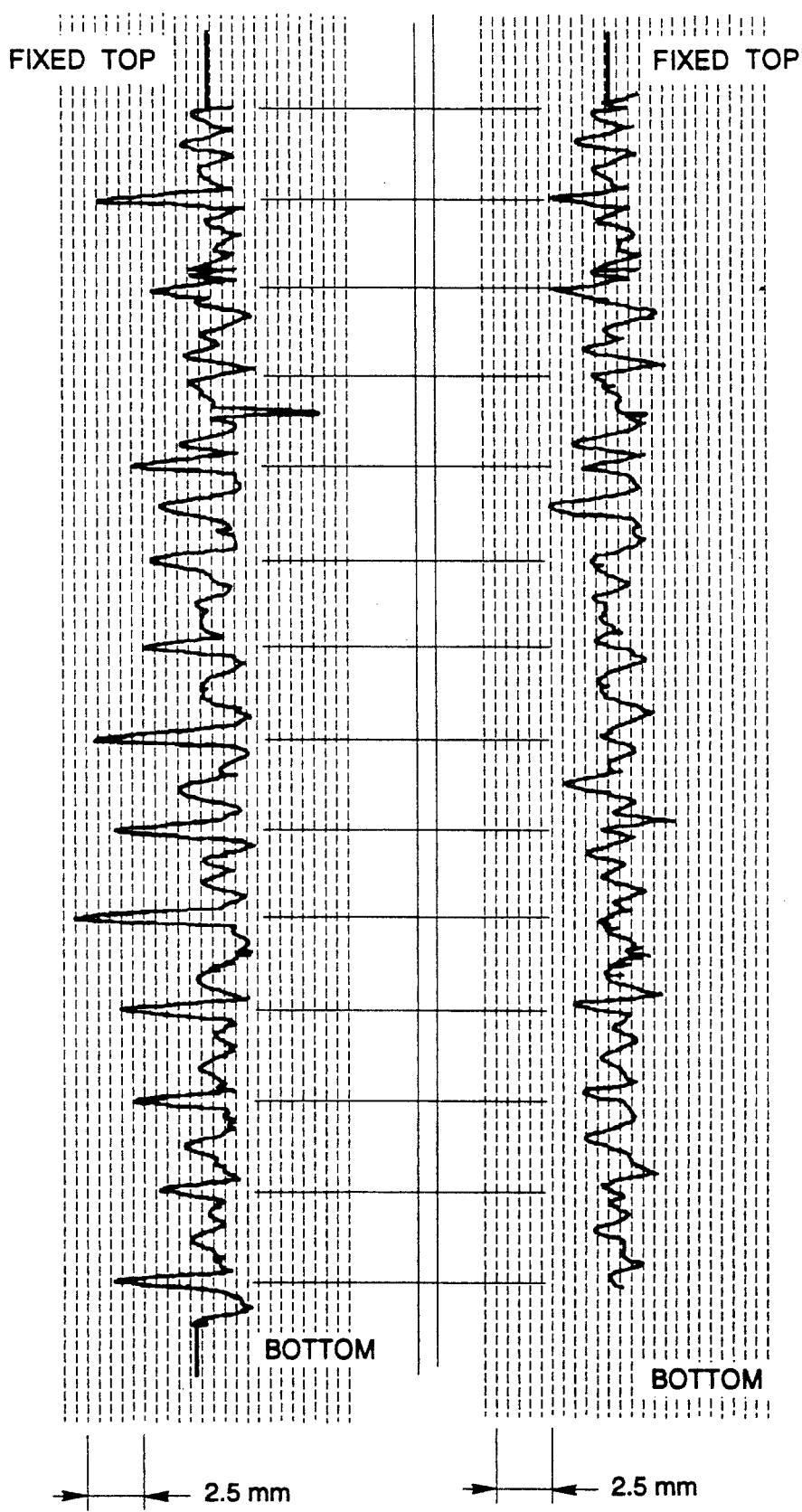
FIGS. 6a and 6b present guide rail profiles before and after straightening using the process and apparatus of the invention.

FIG. 6a represents the profile of a guide rail as measured by means of the measuring apparatus of the invention. The diagram clearly shows the bends at the guide rail joints (joint 1, joint 2, etc.). At worst, the deflections measure over one millimeter from the line of the guide rail line, e.g. at the joint indicated with an arrow.

FIG. 6b shows the profile of the same guide rail after corrections. The corrected deflections are only a fraction of those measured before the correction. The profiles in FIGS. 6a and 6b were obtained by measuring the surface lying in the direction of the nose of the rail.

It will be apparent to a person skilled in the art that the invention is not restricted to the examples described above but may instead by varied within the scope of the claims.

For example, the following variations or their combinations are covered by the idea of the invention as defined in the claims:

The wheels following the rails can be replaced with, for example, sliding elements.

The detector measuring the distance of the measuring device 1 from the guide rail surface may alternatively be an ultrasonic detector or some other type of non-contact detector instead of one with a mechanical follower.

Instead of a recorder/amplifier combination, the measurement data obtained from the detector may be stored after suitable processing in the memory of a portable computer or storage unit and printed from the memory to a display screen or on paper.

In the foregoing, a single-channel type of checking equipment was described, but it would be easy to construct an apparatus with several channels to allow simultaneous inspection of two guide surfaces of the same rail, or even two or more rails. In the straightening device, the screw could be replaced by some other type of device (e.g. hydraulic cylinder) to apply a thrust to the guide rail.

The examples described above concentrate on the straightening of guide rail joints. However, if the straightening equipment is made to larger dimensions, it can also be used for the straightening of other parts of the guide rail line.

We claim:

1. A procedure for checking the straightness of an elevator guide rail and straightening the rail by means of a measuring apparatus movable along the rail, said measuring apparatus comprising a frame supporting two longitudinally spaced guides adapted to maintain contact with the guide rail and a distance detector capable of measuring a distance between the guide rail and a straight line extending between points of contact of said spaced guides with said guide rail, and generating a signal representative of the measured distance, said rail being held in position by fixing devices, said procedure comprising the steps of:

inspecting the guide rail by moving said measuring apparatus along the guide rail, and recording said signal representative of the measured distance;

determining where deflections of the guide rail exceed a predetermined allowable limit, on the basis of the recorded signal;

moving said measuring apparatus to each excessively deflected portion of the guide rail in turn, and deforming that portion of the guide rail until the signal generated by said distance detector of said measuring apparatus indicates a measured distance of approximately zero; and tightly securing said fixing devices so as to hold the guide rail against subsequent deflection.

2. A procedure as claimed in claim 1, wherein deflections in the plane of the back of the guide rail are straightened by providing a back stop for the guide rail above and below the area to be straightened; applying to the rail a force of sufficient magnitude to overcome the rigidity of the rail, essentially opposite to the direction of the deflection; and fixing the area to be straightened to a substantially rigid backing plate.

3. A procedure as claimed in claim 1, wherein deflections normal to the plane of the back of the guide rail are straightened by providing at least one shim between a backing plate and the guide rail line.

4. A procedure according to claim 1, 2 or 3, wherein the straightness of elevator guide rails is checked by inspecting the guide surfaces of the rails.

5. An apparatus for checking the straightness of elevator guide rails and straightening their deflections, said apparatus comprising:

measuring means for checking the straightness of the guide rails, said measuring means comprising a measuring device movable along the rail and two guides which are adapted to lean against the rail in longitudinally spaced relation to each other, said measuring device including a measuring element disposed between said guides and capable of measuring the distance between the guide rail and the measuring device and means for generating a signal representative of the measured distance;

at least one straightening device provided with at least one gripping element adapted to allow the straightening device to be secured against the guide rail by gripping said guide rail from one side at points above and below the area to be straightened, and a thrust element adapted to apply a force to the guide rail from the side of the rail opposite from said gripping elements; and one or more backing plates, an assortment of shims adapted to be fitted between a backing plate and a guide rail, and fixing means for fixing the backing plates to the guide rail line.

6. An apparatus as claimed in claim 5, further comprising a recording device for recording the signal representative of measured distance generated by the measuring device.

7. An apparatus as claimed in claim 7, further comprising an processor unit adapted to process the signal representing the distance between the guide rail and the measuring device, prior to the data being recorded by said recorder.

8. A measuring apparatus for checking the straightness of elevator guide rails, said measuring apparatus being mounted on an elevator car frame in a manner enabling it to follow the vertical motion of the car and comprising:

a measuring device movable along the rail, said measuring device including a measuring element capable of measuring the distance between the guide rail and the measuring device;

means for generating a signal representative of the measured distance; and two guides adapted to lean against the rail in longitudinally spaced relation to each other, so as to maintain a substantially constant distance between the measuring apparatus and the guide rail.

9. A measuring apparatus as claimed in claim 8, wherein the measuring device is placed between the guides.

10. A measuring apparatus as claimed in claim 8, further comprising a recording device for recording the measurement result obtained from the measuring device or data proportional thereto.

11. A measuring apparatus as claimed in claim 10, further comprising an processor unit adapted to process a data signal representing the distance between the guide rail and the measuring device, prior to the data being recorded by said recorder.

12. A measuring apparatus according to claim 8, wherein said measuring apparatus is suspended by a flexible supporting line so as to allow said measuring apparatus to follow the vertical motion of the elevator car and the horizontal deflections of the guide rails, said flexible supporting line being attached to a supporting bar attached at one end to the elevator car frame, and including guide means adapted to allow the supporting bar to follow the guide rail.

13. A measuring apparatus according to claim 8, further comprising at least one magnet so arranged that magnetic attraction holds the guides of the measuring apparatus in contact with the guide rail.

* * * * *